United States Patent [19]
Lasoen

[11] Patent Number: 5,473,959
[45] Date of Patent: Dec. 12, 1995

[54] TRANSMISSION SHIFTING APPARATUS HAVING MANUALLY OPERABLE SELECTOR SHAFT

[75] Inventor: Jean-Jacques Lasoen, Villepreux, France

[73] Assignee: Massey Ferguson S.A., Beauvais, France

[21] Appl. No.: 132,629

[22] Filed: Oct. 6, 1993

[30] Foreign Application Priority Data

Oct. 8, 1992 [GB] United Kingdom ............... 9221205

[51] Int. Cl.$^6$ .......................... F16H 59/04; F16H 63/08
[52] U.S. Cl. ................................... 74/335; 477/906
[58] Field of Search ..................... 74/335, 336 R, 74/625, 483 R; 477/906

[56] References Cited

U.S. PATENT DOCUMENTS

| | | | |
|---|---|---|---|
| 1,413,058 | 4/1922 | Richardson | 74/473 |
| 4,580,457 | 4/1986 | Ishida et al. | 74/335 |
| 4,841,816 | 6/1989 | Bullock | 477/906 |
| 4,986,142 | 1/1991 | Borodin et al. | |
| 5,134,903 | 8/1992 | Itoh | 74/335 |

FOREIGN PATENT DOCUMENTS

| | | |
|---|---|---|
| 1449375 | 1/1989 | U.S.S.R. |
| 8809452 | 12/1988 | WIPO |

*Primary Examiner*—Charles A. Marmor
*Assistant Examiner*—Sherry Estremsky
*Attorney, Agent, or Firm*—MacMillan, Sobanski & Todd

[57] ABSTRACT

A vehicle transmission unit is housed in a casing and includes a plurality of drive ratio paths selectively engageable by a ratio selection system. The ratio selection system includes fluid-pressure-operated actuators under the control of solenoid-operated valves to select the operative drive ratio of the transmission. The transmission also includes one or more mechanical actuator members accessible from outside the casing which can be manipulated to select one or more drive ratios of the unit in the event of the failure of the fluid-pressure-operated actuators or valves.

20 Claims, 2 Drawing Sheets

5,473,959

TRANSMISSION SHIFTING APPARATUS HAVING MANUALLY OPERABLE SELECTOR SHAFT

BACKGROUND OF THE INVENTION

This invention relates to transmission units in which the operative ratio is selected by a selection system which includes fluid-pressure-operated actuators under the control of solenoid-operated valves. Such transmission units are used, for example, in agricultural/industrial tractors.

Whilst such transmission units operate effectively they can be prone to break down due to minor electrical problems, etc. which leave the valves and thus the fluid-pressure-operated actuators inoperative thus completely disabling the transmission unit.

It is an object of the present invention to provide an improved form of such a transmission unit in which the problem of transmission disablement is mitigated.

SUMMARY OF THE INVENTION

Thus according to the present invention there is provided a vehicle transmission unit housed in a casing and including a plurality of drive ratio paths selectively engageable by a ratio selection system which includes fluid-pressure-operated actuators under the control of solenoid-operated valves to select the operative drive ratio of the transmission, the transmission also including one or more mechanical actuator members accessible from outside the casing which can be manipulated to select one or more drive ratios of the unit in the event of the failure of the fluid-pressure-operated actuators or valves.

A transmission unit in accordance with the present invention thus provides a "get you home" facility which still enables one or more drive ratios of the unit to be selected manually should the fluid-pressure-operated actuators or valves fail.

Conveniently, the fluid-pressure-operated actuators are connected to ratio engaging means (such as selector forks) via mechanical linkage means and said one or more mechanical actuator members are also connected to said mechanical linkage means.

The mechanical actuator member or members may comprise one or more shafts projecting from the transmission casing which can be manipulated by a spanner, wrench or similar instrument to effect selection of one or more drive ratios in the unit.

The transmission unit may be controlled manually by the operator initiating each drive ratio selection or automatically by, for example, an electronic control system which initiates each drive ratio selection in accordance with predetermined vehicle performance parameters.

BRIEF DESCRIPTION OF THE DRAWING

One embodiment of the present invention as applied to an agricultural tractor transmission will now be described, by way of example only, with reference to the accompanying drawings in which.

DETAILED DESCRIPTION OF THE PREFERRED EMBODIMENT

Figure 1:
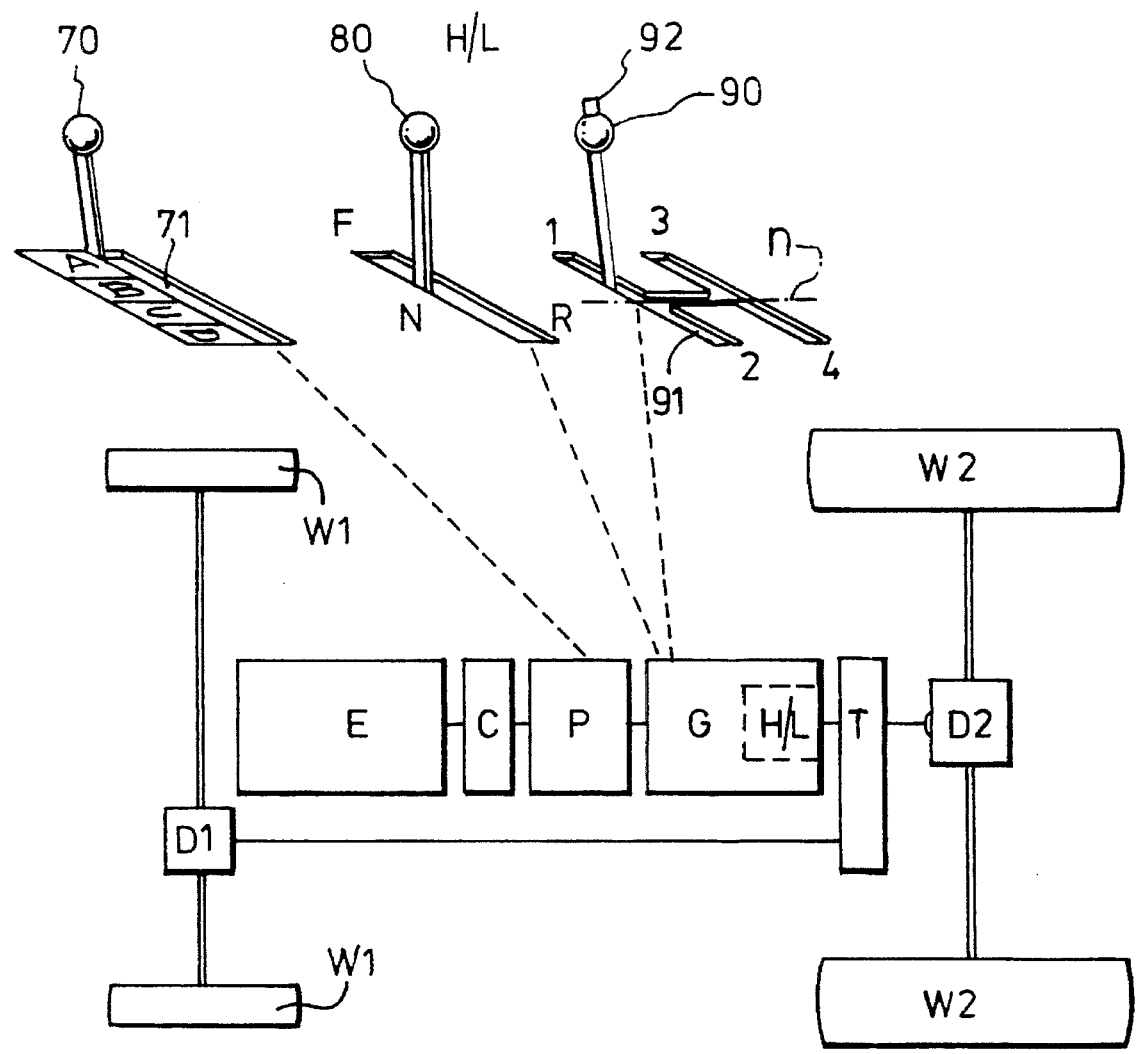
FIG. 1 is a diagrammatic representation of the basic tractor transmission layout.

Referring to FIG. 1, this shows the diagrammatic layout of a tractor transmission in which engine E drives front and rear wheels W1 and W2 via differentials D1 and D2, a main clutch C, a planetary gear unit P, a main gearbox G and a transfer box T. As shown in FIG. 1, the gearbox G includes an input shaft, which is connected to the planetary gear unit P and extends within the casing of the transmission, and an output shaft, which extends from within the casing of the transmission and is connected to the transfer case T. The main gearbox G will typically have four ratios and a forward/reverse direction selection train in addition to a high/low range facility indicated in dotted detail H/L in FIG. 1.

U.S. Pat. No. 5,249,481 discloses a suitable form of planetary gear unit P for use in the transmission which has four ratios which provide ranges A, B, C and D of the transmission. Four clutches are provided to engage the ratios of planetary gear unit P. These clutches are divided into two pairs, one clutch of each pair being hydraulically engaged and the other mechanically by spring force. The configuration of the planetary gear train is such that one clutch of each pair must be engaged in order to provide a drive path through the planetary gear unit. Thus in the event of the failure of hydraulic pressure the spring engaged clutch of each pair operates to provide a drive path through the planetary gear unit.

Further details of a suitable form of planetary gear unit and a suitable ratio selection system for the planetary gear unit are contained in the previously referred to U.S. Pat. No. 5,249,481 and will not be repeated here since they form no part of the present invention.

Main gearbox G forms a transmission unit in accordance with the present invention in which its four drive ratios, its forward/reverse direction selection and its high/low range facility are all operated hydraulically using solenoid operated fluid flow control valves.

Figure 2:
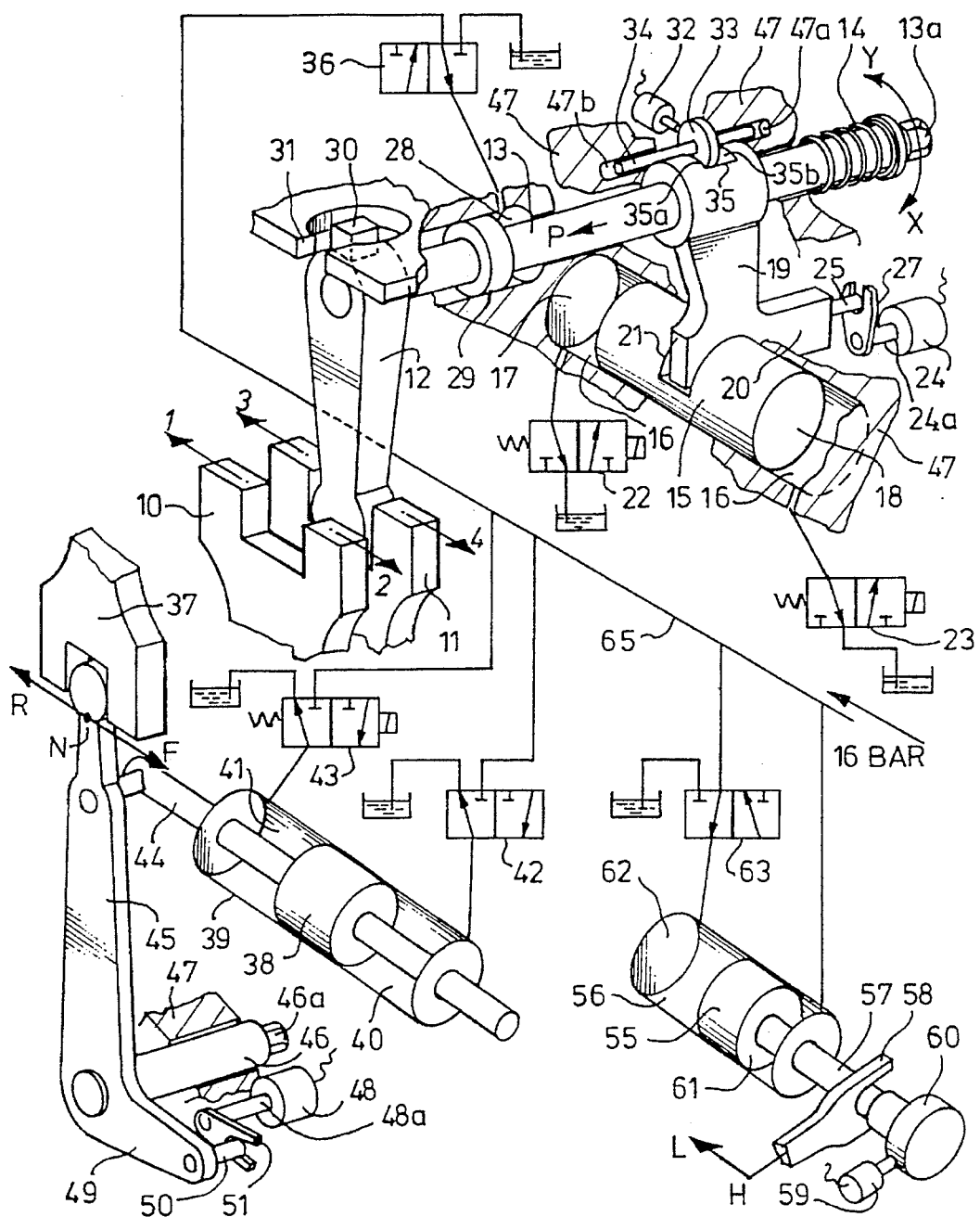
FIG. 2 is a diagrammatic representation of the ratio selection system of a transmission unit embodying the present invention.

FIG. 2 shows diagrammatically a ratio selection system for the main gearbox G in which the four ratios of the gearbox are selected by two selector forks one end of each of which is shown at 10 and 11. Selector fork 10 is movable, as indicated by arrows 1 and 2, from the neutral drive condition shown in FIG. 2 to select ratios 1 and 2 of the gearbox. Similarly selector fork 11 is movable in the directions indicated by arrows 3 and 4 to select ratios 3 and 4 of the gearbox. The selector forks are movable by a selector member 12 mounted on a selector shaft 13, this shaft being both rotatable and axially displaceable. Shaft 13 is biased by spring 14 to the axial position shown in FIG. 2 in which selector member 12 engages selector fork 11. As shown in FIG. 2, the spring to is a coiled spring which is disposed about the shaft 13 and reacts between the casing 47 of the transmission and an enlarged portion formed on the outer end of the shaft 13. Selector member 12 is rotatable about the longitudinal axis of shaft 13 by a double acting piston 15 which is slidable in a bore 16 in transmission casing 47 to define end chambers 17 and 18 respectively. Piston 15 is connected to shaft 13 by an arm 19 which is nonrotatably secured on shaft 13 and has a spade-like end portion 20 which engages in a slot 21 in piston 15.

Thus, as will be appreciated, shaft 13 can be rotated in a clock-wise sense as indicated by arrow X by pressurising end chamber 16 using solenoid operated valve 23 thus moving selector fork 11 to engage ratio 3 in gearbox G. Similarly, shaft 13 can be rotated in an anti-clock sense as indicated by arrow Y by pressurizing end chamber 17 using solenoid operated valve 22. This moves selector fork 11 to engage ratio 4 of the gearbox. The axial position of piston 15 and hence the operative position of selector fork 11 (and also selector fork 10 when it is engaged by arm 12) is indicated by a rotary potentiometer 24 which is connected to end portion 20 of arm 19 via a peg 25 which engages a cut-out in an arm 27 mounted on the spindle 24a of the potentiometer 24.

The shaft 13 is displaced axially in direction P by pressurising a chamber 28 which contains a piston portion 29 formed on shaft 13. Pressurization of chamber 28, which is controlled by solenoid operated valve 36, displaces shaft 13 to move selector member 12 out of selector fork 11 into selector fork 10. An interlock member 30 formed on the top of selector member 12 co-operates an interlock formation 31 formed on the housing to ensure that the selector member 12 can only be disengaged from selector fork 11 and engaged with selector 10 when the shaft 13 is in its neutral selection position, as shown in FIG. 2.

The axial position of shaft 13 is indicated by a proximity sensor 32 which co-operates with a disc member 33 mounted on a sliding rod 34. This member 33 which is mounted in bores 47a and 47b in the transmission casing 47 is also received in a cut-out 35 in the mounting boss of arm 19. When the selector member 12 is engaged in the selector fork 11, as shown in FIG. 2, the left-hand edge 35a of the cut-out 35 positions the disc member 33 opposite the sensor 32 to provide a high reading from the sensor. When the shaft 13 is moved in direction P to engage selector fork 10, the right-hand edge 35b of slot 35 contacts disc member 33 during the latter part of the movement of shaft 13 in order to move the disc member 33 away from the proximity sensor 32 in direction P. This thus provides a low reading from the sensor indicating that the shaft has been axially displaced to engage the seector fork 10.

In accordance with the present invention, the shaft 13 is provided with a square or hexagonally-shaped end portion 13a which projects externally from the transmission casing 47 and can be gripped for both rotation and axial displacement by a suitable spanner, wrench or other tool in order to move selector member 12 manually to select any one of the ratios 1 to 4 of the transmission unit should pistons 15 and 29 be incapacitated due to hydraulic or electrical failure.

The forward/reverse drive direction is selected by a fork one end of which is shown at 37. Fork 37 is moved by a double-acting piston 38 movable in a bore 39 to define end chambers 40 and 41 respectively. Piston 38 can be displaced by pressurising either end chamber 40 using solenoid operated valve 42, or chamber 41 using solenoid operated valve 43. A rod 44 connects piston 38 with a selector member 45 which rotates with a mounting shaft 46 supported in the transmission casing 47.

Thus pressurization of end chamber 40 axially displaces rod 44 to the left as viewed in FIG. 2 thus pivoting selector member 45 with rod 46 in an anti-clockwise sense in the transmission casing 47 to displace the selector fork 37 to the left from the neutral position shown. This engages the reverse drive condition in the transmission unit. Similarly, pressurization of end chamber 41 moves the rod 44 to the right thus pivoting the selector member 45 in a clock-wise sense and hence moving the selector fork 37 to the right to engage the forward drive condition of the transmission unit.

The position of the piston 38 and hence the drive condition engaged in the transmission unit is indicated by the reading from a rotary potentiometer 48 which is connected to the selector member 45 via an arm 49, a pin 50 and a slotted arm 51 mounted on the rotary potentiometer spindle 48a.

In accordance with the present invention the mounting shaft 46 is also provided with a square or hexagonally-shaped end portion 46a which projects externally from the transmission casing 47 and can be gripped and rotated by a suitable wrench or other tool in order to displace the selector member 45 thus engaging manually either the forward or reverse drive direction should the piston 38 be incapacitated due to hydraulic or electrical failure.

The high/low range facility of the transmission unit is operated by a piston 55 which operates in a bore 56 thus defining end chambers 61 and 62. Piston 55 is provided with a rod 57 which moves a selector fork of the high/low range facility one end of which is shown at 58. A proximity sensor 59 operates in conjunction with an enlarged diameter port on 60 of rod 57 to indicate the axial position of piston 55 and thus whether the high/low range facility is engaged. To engage the high range facility solenoid-operated valve 63 is operated to connect end chamber 62 to the hydraulic system pressure of line 65. End chamber 61 is permanently connected to line 65 so that both sides of piston 55 are subject to the operating pressure and, as a result of the differential area effect caused by the provision of rod 57 on one side of piston 55 only, the piston is moved to its extreme right-hand travel position shown in FIG. 2.

In order to engage the low range facility chamber 62 is depressurised using valve 63 so that the pressure in chamber 61 moves the piston 55 to the left, thus engaging the low range. No neutral condition is provided on the high/low range facility, thus in the event of an hydraulic or electrical failure the facility will provide either the high or low range drive depending on the condition selected at the time of the failure.

The ratio selection system described above for gearbox G utilizes solenoid-operated valves 22, 23, 36, 42, 43 and 63 and their associated hydraulic actuators in the form of pistons 15, 29, 38 and 55 to select the various ratios, the drive direction and the operative high/low range facility of the gearbox. In order to remove the necessity to maintain the system hydraulic pressure on the pistons 15, 29, 38 and 55 at all times each of these pistons is associated with a detent system (not shown in FIG. 2) which mechanically holds the piston in the position last selected by the hydraulic pressure.

The valves 22, 23, 36, 42, 43 and 63 may be controlled in a wide variety of ways. For example, the valves may be controlled manually by the tractor operator using, for example, the control levers 70, 80 and 90 shown in FIG. 1. Control lever 70 moves in a straight control gate 71 which has selection positions A, B, C and D corresponding to the four ratios of the planetary gear unit P. Control lever 80 moves in a straight gate 81 to select the forward, neutral and reverse drive conditions of the gearbox. Control lever 90 moves in a conventional H-shaped gate 91 with ratio positions 1 to 4 for the selection of the four ratios of gearbox G and a neutral plane N. A two-position button or switch 92 on the top of control lever 90 is used to select either the high or low range facility.

Alternatively, the valves 22 to 63 may be controlled by an automatic transmission control system (with or without a manual override capability for the operator) in response to predetermined tractor operating parameters.

It will be appreciated from the above that the complete transmission is still operable should an hydraulic or electrical failure occur since the planetary gear unit P and high/low range facility still retain their drive capability as explained above and main gearbox G still retains a full mechanical selection capability by using a wrench or other tool on the end portions 13a and 46a of the selection shafts 13 and 46.

What is claimed is:

1. A shifting apparatus for a transmission comprising:

a casing;

a selector shaft having a first end extending within said casing and a second end extending outside of said casing, said selector shaft being axially movable between a first position, wherein said selector shaft is positioned to engage a first gear engaging member disposed within the transmission for movement, and a second position, wherein said selector shaft is positioned to engage a second gear engaging member disposed within the transmission for movement; and a spring reacting between said casing and said second end of said selector shaft for urging said selector shaft toward said second position.

2. The shifting apparatus defined in claim 1 wherein said second end of said selector shaft has an enlarged portion disposed outside of the casing, and wherein said spring reacts between said casing and said enlarged portion.

3. The shifting apparatus defined in claim 2 wherein said spring is a coiled spring disposed about said selector shaft.

4. The shifting apparatus defined in claim 1 wherein said spring is a coiled spring.

5. The shifting apparatus defined in claim 4 wherein said coiled spring is disposed about said selector shaft.

6. The shifting apparatus defined in claim 1 wherein said second end of said selector shaft has an end portion formed thereon for facilitating manual movement of said selector shaft.

7. The shifting apparatus defined in claim 6 wherein said end portion is formed having a shape which can be gripped for rotation.

8. The shifting apparatus defined in claim 6 wherein said end portion is formed having a hexagonal shape.

9. The shifting assembly defined in claim 1 further including a fluid operated actuator connected to said selector shaft for axially moving said selector shaft between said first and second positions.

10. The shifting apparatus defined in claim 9 further including a solenoid operated valve for controlling the operation of said fluid operated actuator.

11. A transmission comprising:

a easing;

an input shaft extending within said easing;

an output shaft extending within said casing;

a gearbox adapted to provide a plurality of gear ratios between said input shaft and said output shaft;

a first gear engaging member disposed within said casing and movable between a first position, wherein said output shaft rotates at a first gear ratio relative to said input shaft at a first gear ratio, and a second position, wherein said output shaft rotates at a second gear ratio relative to said input shaft at a second gear ratio;

a second gear engaging member disposed within said casing and movable between a first position, wherein said output shaft rotates at a third gear ratio relative to said input shaft at a third gear ratio, and a second position, wherein said output shaft rotates at a fourth gear ratio relative to said input shaft at a fourth gear ratio;

a selector shaft having a first end extending within said casing and a second end extending outside of said casing, said selector shaft being axially movable between a first position, wherein said selector shaft is positioned to engage said first gear engaging member, and a second position, wherein said selector shaft is positioned to engage said second gear engaging member; and a spring reacting between said casing and said second end of said selector shaft for urging said selector shaft toward said second position.

12. The transmission defined in claim 11 wherein said second end of said selector shaft has an enlarged portion disposed outside of the casing, and wherein said spring reacts between said casing and said enlarged portion.

13. The transmission defined in claim 12 wherein said spring is a coiled spring disposed about said selector shaft.

14. The transmission defined in claim 11 wherein said spring is a coiled spring.

15. The transmission defined in claim 14 wherein said coiled spring is disposed about said selector shaft.

16. The transmission defined in claim 11 wherein said second end of said selector shaft has an end portion formed thereon for facilitating manual movement of said selector shaft.

17. The transmission defined in claim 16 wherein said end portion is formed having a shape which can be gripped for rotation.

18. The transmission defined in claim 16 wherein said end portion is formed having a hexagonal shape.

19. The transmission defined in claim 11 further including a fluid operated actuator connected to said selector shaft for axially moving said selector shaft between said first and second positions.

20. The shifting assembly defined in claim 19 further including a solenoid operated valve for controlling the operation of said fluid operated actuator.

\* \* \* \* \*

UNITED STATES PATENT AND TRADEMARK OFFICE
CERTIFICATE OF CORRECTION

PATENT NO.  : 5,473,959
DATED       : December 12, 1995
INVENTOR(S) : Jean-Jacques Lasoen It is certified that error appears in the above-identified patent and that said Letters Patent are hereby corrected as shown below:

Column 5, Claim  9, Line 1,  after "shifting", change "assembly" to -- apparatus --.

Column 5, Claim 11, Line 2,  after "a", change "easing" to -- casing --.

Column 5, Claim 11, Line 3,  after "said", change "easing" to -- casing --.

Column 6, Claim 20, Line 1,  after "The", change "shifting assembly" to -- transmission --.

Signed and Sealed this

Twelfth Day of March, 1996

Attest:

BRUCE LEHMAN

*Attesting Officer*                *Commissioner of Patents and Trademarks*